(12) United States Patent
Landa (10) Patent No.: US 10,815,360 B2
(45) Date of Patent: Oct. 27, 2020

(54) THERMAL CONDUCTION TRANSFER PRINTING

(71) Applicant: Landa Labs (2012) LTD., Rehovot (IL)

(72) Inventor: Benzion Landa, Nes Ziona (IL)

(73) Assignee: LANDA LABS (2012) LTD., Rehovot (IL)

( * ) Notice: Subject to any disclaimer, the term of this patent is extended or adjusted under 35 U.S.C. 154(b) by 0 days.

(21) Appl. No.: 16/465,041

(22) PCT Filed: Nov. 30, 2017

(86) PCT No.: PCT/IB2017/057542
§ 371 (c)(1),
(2) Date: May 29, 2019

(87) PCT Pub. No.: WO2018/100530
PCT Pub. Date: Jun. 7, 2018

(65) Prior Publication Data
US 2019/0322099 A1    Oct. 24, 2019

(30) Foreign Application Priority Data
Nov. 30, 2016    (WO) .................. PCT/IB2016/057226

(51) Int. Cl.
*B41J 2/005*    (2006.01)
*C08K 3/36*    (2006.01)
(Continued)

(52) U.S. Cl.
CPC ............... *C08K 3/36* (2013.01); *B41J 2/0057* (2013.01); *B41M 5/025* (2013.01);
(Continued)

(58) Field of Classification Search
CPC ...... C08K 3/36; C08K 3/04; C08K 2201/005; C09C 1/56; B41M 5/52; B41M 5/025;
(Continued)

(56) References Cited

U.S. PATENT DOCUMENTS 4,435,064 A    3/1984    Tsukada et al.
4,741,918 A    5/1988    Nagi et al.
(Continued)

FOREIGN PATENT DOCUMENTS

CN    1569475    1/2005
EP    2813371    12/2014
(Continued)

OTHER PUBLICATIONS

"Selfoc Lens Arrays", Dec. 25, 2010, downloaded on Apr. 21, 2019 from the World Wide Web at http://www.panchromos.com/selfoc-lens-arrays.
(Continued)

*Primary Examiner* — Yaovi M Ameh
(74) *Attorney, Agent, or Firm* — Shalom Wertsberger; Saltamar Innovations (57) ABSTRACT

A printing system is disclosed for thermal transfer printing onto a surface of a substrate. The system comprises a transfer member having opposite front and rear sides with an imaging surface on the front side, a coating station at which a monolayer of particles made of, or coated with, a thermoplastic polymer is applied to the imaging surface, an imaging station at which energy is applied by a thermal print head via the rear side of the transfer member to selected regions of the particles coated imaging surface to render particles coating the selected regions tacky, and a transfer station at which the imaging surface of the transfer member and the substrate
(Continued)

surface are pressed against each other to cause transfer to the surface of the substrate of the particles that have been rendered tacky.

19 Claims, 3 Drawing Sheets (51) Int. Cl.
*B41M 5/025* (2006.01)
*B41M 5/03* (2006.01)
*C08G 77/04* (2006.01)
*B41M 5/52* (2006.01)
*C08K 3/04* (2006.01)
*C09C 1/56* (2006.01)
*C09D 7/40* (2018.01)
*C08L 83/04* (2006.01)

(52) U.S. Cl.
CPC ............ *B41M 5/0256* (2013.01); *B41M 5/03* (2013.01); *B41M 5/52* (2013.01); *C08G 77/04* (2013.01); *C08K 3/04* (2013.01); *C09C 1/56* (2013.01); *B41M 2205/06* (2013.01); *B41M 2205/10* (2013.01); *C01P 2004/04* (2013.01); *C01P 2004/50* (2013.01); *C01P 2004/61* (2013.01); *C01P 2004/62* (2013.01); *C01P 2006/12* (2013.01); *C01P 2006/19* (2013.01); *C08K 2201/005* (2013.01); *C08L 83/04* (2013.01); *C09D 7/66* (2018.01)

(58) Field of Classification Search
CPC .. B41M 5/0256; B41M 5/03; B41M 2205/06; B41M 2205/10; B41J 2/0057; C08G 77/04; C01P 2004/04; C01P 2004/50; C01P 2004/61; C01P 2004/62; C01P 2006/12; C01P 2006/19; C08L 83/04; C09D 7/66
See application file for complete search history.

(56) References Cited

U.S. PATENT DOCUMENTS

| | | | |
|---|---|---|---|
| 5,085,803 A | 2/1992 | Wakita et al. | |
| 5,568,320 A | 10/1996 | Rees et al. | |
| 5,751,327 A | 5/1998 | De Cock et al. | |
| 6,354,700 B1* | 3/2002 | Roth | B41J 2/0057 347/102 |
| 6,469,728 B1 | 10/2002 | Charnitski et al. | |
| 6,569,494 B1 | 5/2003 | Chambers et al. | |
| 6,623,816 B1 | 9/2003 | Tanikawa et al. | |
| 7,002,613 B2 | 2/2006 | Beier et al. | |
| 8,363,735 B2 | 2/2013 | Soulliaert et al. | |
| 8,947,486 B2 | 2/2015 | Tsuchiya | |
| 9,707,799 B2 | 7/2017 | Dalisay et al. | |
| 10,061,200 B2 | 8/2018 | Rubin Ben Haim et al. | |
| 10,336,059 B2 | 7/2019 | Landa et al. | |
| 2002/0000190 A1* | 1/2002 | Neuhaus | B41M 1/10 118/231 |
| 2002/0031645 A1 | 3/2002 | Sano et al. | |
| 2002/0150333 A1 | 10/2002 | Reed et al. | |
| 2003/0067529 A1 | 4/2003 | May et al. | |
| 2006/0109440 A1 | 5/2006 | De Jager | |
| 2008/0151034 A1 | 6/2008 | Mohri et al. | |
| 2008/0166495 A1 | 7/2008 | Maeno et al. | |
| 2008/0181667 A1 | 7/2008 | Nomura et al. | |
| 2009/0009580 A1 | 1/2009 | Nomura | |
| 2009/0140631 A1 | 6/2009 | Jo | |
| 2009/0141114 A1 | 6/2009 | Tsujino et al. | |
| 2010/0075843 A1 | 3/2010 | Ikuno et al. | |
| 2010/0080594 A1 | 4/2010 | Sowa et al. | |
| 2012/0049123 A1 | 3/2012 | Jin | |
| 2012/0103212 A1 | 5/2012 | Stowe | |
| 2013/0127149 A1 | 5/2013 | Tombs et al. | |
| 2013/0235116 A1 | 9/2013 | Takemoto | |
| 2013/0250021 A1 | 9/2013 | Shimomura et al. | |
| 2013/0342622 A1 | 12/2013 | Takashi et al. | |
| 2014/0026771 A1 | 1/2014 | Schlumm | |
| 2014/0063161 A1 | 3/2014 | Liu | |
| 2014/0168330 A1 | 6/2014 | Liu et al. | |
| 2014/0168336 A1 | 6/2014 | Mettu et al. | |
| 2014/0370193 A1 | 12/2014 | Nogushi et al. | |
| 2015/0070454 A1 | 3/2015 | Moorlag et al. | |
| 2015/0092004 A1 | 4/2015 | Kanungo et al. | |
| 2015/0118389 A1 | 4/2015 | Jang et al. | |
| 2015/0298467 A1 | 10/2015 | Cofler | |
| 2015/0352836 A1 | 12/2015 | Kanasugi | |
| 2016/0176185 A1* | 6/2016 | Kanungo | B41J 2/01 347/103 |
| 2017/0072427 A1 | 3/2017 | Landa et al. | |
| 2017/0075226 A1 | 3/2017 | Nagler et al. | |
| 2018/0329306 A1 | 11/2018 | Rubin Ben Haim et al. | |

FOREIGN PATENT DOCUMENTS

| | | |
|---|---|---|
| EP | 3055138 | 12/2018 |
| GB | 712437 | 12/1950 |
| GB | 2474474 | 4/2011 |
| GB | 2536361 | 9/2016 |

OTHER PUBLICATIONS

U.S. Appl. No. 16/046,973, filed Jul. 26, 2018, published as 2018-0329306; Co-Owned and concurrently prosecuted by Landa Labs (2012) Ltd.
U.S. Appl. No. 15/363,520, filed Nov. 29, 2016, published as 2017-0075226; Co-Owned and concurrently prosecuted by Landa Labs (2012) Ltd.
U.S. Appl. No. 15/363,615, filed Nov. 29, 2016, published as 2017-0072428; Co-Owned and concurrently prosecuted by Landa Labs (2012) Ltd.
U.S. Appl. No. 15/362,983, filed Nov. 29, 2016, published as 2017-0072427; Related and concurrently prosecuted.
U.S. Appl. No. 16/410,390, filed May 13, 2019, continuation of U.S. Pat. No. 10,336,059; Co-Owned and concurrently prosecuted by Landa Labs (2012) Ltd.
U.S. Appl. No. 16/464,782, filed May 29, 2019; Co-Owned and concurrently prosecuted by Landa Labs (2012) Ltd.
U.S. Appl. No. 16/425,559, filed May 29, 2019; Co-Owned and concurrently prosecuted by Landa Labs (2012) Ltd.
U.S. Appl. No. 16/424,712, filed May 29, 2019; Co-Owned and concurrently prosecuted by Landa Labs (2012) Ltd.
U.S. Appl. No. 16/424,721, filed May 29, 2019; Co-Owned and concurrently prosecuted by Landa Labs (2012) Ltd.

* cited by examiner

THERMAL CONDUCTION TRANSFER PRINTING

This application is a National Phase Application filed under 35 U.S.C. 371 as a national stage of PCT/IB2017/057542 filed on 30 Nov. 2017, which claims Paris Convention priority from PCT/IB2016/057226, filed on 30 Nov. 2016, the contents of both being incorporated by reference in their entirety as if fully set forth herein.

FIELD

The present disclosure relates to a method and system for printing on a surface of a substrate with a film of a thermoplastic material.

BACKGROUND

The present disclosure is a development of the teachings of WO2016/189512 to the same Applicant, which was published on 1 Dec. 2016 and has a priority date of 27 May 2015. To avoid unnecessary repetition, reference will be made throughout the present disclosure to the latter publication.

Thermal transfer printers are known that employ a ribbon carrying a polymeric ink film. The ribbon is equivalent to the ink ribbon used in a conventional typewriter but the ink is solid ink and is transferred from it onto a substrate (usually paper) not by impact but by means of a thermal print head that heats only the regions of the ribbon from which the ink is to be transferred to the paper. Thermal transfer printers can print in monochrome or in full color, by transferring images successively from colored ribbons.

Such printers achieve printing of high quality but are wasteful, and therefore costly to operate, since the ribbon is generally single-use and when discarded, much of its ink surface has not been transferred to a printing substrate.

WO2016/189512 discloses a printing system and method that operate on the same principle as thermal transfer printers, but in which the single-use ribbon is replaced by a transfer member which, rather than carrying a polymeric ink film, is coated with a layer of thermoplastic or thermoplastic-coated particles, which can be replenished after each transfer cycle, enabling the transfer member to perform multiple printing cycles, significantly reducing waste.

In particular, WO2016/189512 discloses a method of thermal transfer printing onto a surface of a substrate, which method comprises the steps of:

a) providing a transfer member having front and rear sides with an imaging surface on the front side, b) coating the imaging surface of the transfer member with individual particles formed of, or coated with, a thermoplastic polymer, c) removing substantially all particles that are not in direct contact with the imaging surface to leave a uniform monolayer particle coating on the imaging surface, d) applying radiation to selected regions of the coated imaging surface to heat and render tacky the particles within the selected regions, and e) pressing at least a portion of the coated imaging surface and at least a corresponding portion of the substrate surface against one another, either during or after application of radiation, to cause transfer to the surface of the substrate of only the regions of the particle coating that have been rendered tacky.

To permit continuous printing, following transfer of particles from the selected regions to a first substrate surface, steps b) and c) may be repeated to apply a fresh monolayer coating of particles at least to the selected regions from which the previously applied monolayer coating was transferred to the substrate surface in step e), so as to leave the imaging surface again uniformly coated with a monolayer of particles for printing onto a subsequent substrate surface, as described in steps d) and e). In other words, for printing of subsequent images (which need not be identical from cycle to cycle), steps b) to e) can be sequentially repeated.

WO2016/189512 only teaches rendering the particles tacky by exposing them to EM radiation and the present invention extends the teaching to an alternative method of rendering the particles tacky.

SUMMARY

In accordance with a first aspect of the present disclosure, there is provided a printing system for thermal transfer printing onto a surface of a substrate, the system comprising:

a) a movable transfer member having opposite front and rear sides with an imaging surface on the front side;

b) a coating station adapted to apply to the imaging surface or at least a segment thereof, a monolayer of particles made of, or coated with, a thermoplastic polymer;

c) an imaging station adapted to apply energy via the rear side of the transfer member to selected regions of the particles coated imaging surface to render the particles thereon tacky within the selected regions; and d) a transfer station adapted to press said imaging surface of said transfer member and said substrate surface, or respective segments thereof, against each other to cause transfer to the surface of the substrate of only the regions of the particle coating that have been rendered tacky;

characterised in that (e) the imaging station comprises a thermal print head in thermal contact with the rear side of the transfer member and operative to apply energy to the particles on the imaging surface by heat conduction through the transfer member.

In accordance with a second aspect of the invention, there is provided a method of thermal transfer printing onto a surface of a substrate, which comprises:

a) providing a movable transfer member having opposite front and rear sides with an imaging surface on the front side, b) applying to the imaging surface a monolayer coating of particles made of, or coated with, a thermoplastic polymer, c) applying heat by thermal conduction via the rear side of the transfer member to selected regions of the coated imaging surface to render the particles thereon tacky within the selected regions, and d) pressing the imaging surface and the surface of the substrate against one another to cause transfer to the surface of the substrate of only the regions of the particle coating that have been rendered tacky;

e) repeating step b) to apply a fresh monolayer coating of particles to the selected regions from which the previously applied monolayer coating was transferred to the substrate surface in step d), to leave the imaging surface again uniformly coated with a monolayer of particles, which can be repeatedly subjected to steps c) to e).

Features of particular non-limiting embodiments of the invention are set out in the appended dependent claims.

The terms "tacky" and "sufficiently tacky" as used herein are not intended to mean that the particle coating is necessarily tacky to the touch but only that it is softened sufficiently to enable its adhesion to the surface of a substrate when pressed against it in the transfer station. The tacky particles or regions of particles rendered tacky are believed to form individual films or contiguous films which following their transfer to a printing substrate may optionally yield thinner films, as a result of the pressure being applied upon contacting of the imaging surface (or a segment thereof) to the substrate (or a corresponding segment thereof) and/or of the optional further processing (e.g., fusing, drying, curing, etc.) of the transferred films. Such optional further processing may include heating of the already-transferred images and/or the receiving substrate by means which do not contact the transferred image or by means which contact the transferred images, both of which means are well known in the art. In the case of non-contact heating, such as hot air, radiant heating, radio frequency heating and the like, heating the transferred image may enhance its adhesion to the substrate, its abrasion resistance, its chemical resistance and the like. In the case of heating means which contact the image, such as silicone-coated fuser rolls or belts, in addition to the benefits of non-contact heating, the image film may also acquire higher gloss and scratch resistance.

The intended meaning of the term "monolayer" and different ways in which a monolayer can be achieved are disclosed in WO2016/189512 and WO2016/189513 which provide details of the particle size, polymer film thickness as well as the design and construction of a coating station for applying the particles.

Briefly, in order to facilitate replenishment of the particle coating on the imaging surface after each transfer, particles that adhere to the imaging surface more strongly than they do to one another are utilized. This results in an applied layer that is substantially a monolayer of individual particles, with little, if any, overlap, the thickness of the monolayer being therefore commensurate (e.g., 1-3-times) with the thickness of the particles. Stated differently, the layer is only one particle thick over a major proportion of the area of the imaging surface and most, if not all, of the particles have at least some direct contact with the imaging surface.

One advantage of having a monolayer is that it can provide for good thermal coupling between the particles and the imaging surface on which the particles are coated.

The thermoplastic particles may have a particle size of less than 40 µm, 20 µm, 10 µm, or less than 5 µm, or less than 1 µm, or within the range of 100 nm to 4 µm, or 300 nm to 1 µm, or 500 nm to 1.5 µm.

To permit the printing on the substrate of patterns corresponding to the selected regions exposed to heat applied by thermal conduction, the affinity of the heated tacky particles needs to be greater to the substrate than to the imaging surface. Moreover this relatively higher affinity of the tacky particle to the substrate in the selected regions shall also be greater than the affinity of the bare substrate to the particles not rendered tacky. In the present context, a substrate is termed "bare" if lacking any desired image pattern to be printed by the present method or system. Though the bare substrate should for most purposes have substantially no affinity to the thermoplastic particles, to enable the selective affinity of the tacky ones, some residual affinity can be tolerated (e.g., if not visually detectable) or even desired for particular printing effects. Undesired transfer of particles to areas of the bare substrate is also termed parasite or parasitic transfer.

The term "thermoplastic particles" is used to refer to all particles (colored or not) comprising a thermoplastic polymer, whether coating the particle or forming substantially all of the particle, including any intermediate range of presence of the polymer allowing the thermoplastic particles to serve their intended purposes. In the latter cases, wherein the thermoplastic polymer(s) can be homogeneously present in the entire particle, not being particularly restricted to an external coating, the particles may also be said to be made of a thermoplastic polymer.

Such gradient of affinities between the particles (before and after heating), the fluid carrying the native particles for coating or replenishing of the transfer member, the imaging surface, the printing substrate, any such element of the method, can be modulated by selection of suitable materials or characteristics, such as hardness, smoothness, hydrophobicity, hydrophilicity, charge, polarity and any such properties known to affect interaction between any two elements.

For assisting in the transfer of the tacky film of particles from the imaging surface to the substrate, the imaging surface may be hydrophobic.

In some embodiments, the thermoplastic particles may themselves be hydrophobic. In such case, the relative affinity between the particles in their different states and the imaging surface can be based, at least partially, on hydrophobic-hydrophobic interactions. In some embodiments, attachment of the monolayer of particles to the imaging surface is assisted by the relative low hardness of the imaging surface as is further detailed below. A relatively soft imaging surface may assist in forming an intimate contact with each individual particle, such intimate contact manifesting itself in a relatively large contact area between the imaging surface and the particle, in contrast to the discrete contact formed between the particle and a relatively hard surface. Such intimate contact may thus further intensify effects of any short-range attraction forces between the imaging surface and the particles, such as, e.g., hydrophobic-hydrophobic interactions or Van der Waals forces.

In some embodiments, the thermoplastic particles and/or the imaging surface can alternatively or additionally achieve desired relative affinity one to another (and to any other fluid or surface suitable for a printing process according to present teachings) by way of charge-based interactions. For instance, positively charged particles may favor negatively charged surfaces. In such case, the relative affinity between the particles in their different states and the imaging surface can be based on charge-charge interactions.

BRIEF DESCRIPTION OF THE DRAWINGS

The description, together with the figures, makes apparent to a person having ordinary skill in the pertinent art how the teachings of the disclosure may be practiced, by way of non-limiting examples. The figures are for the purpose of illustrative discussion and no attempt is made to show structural details of an embodiment in more detail than is necessary for a fundamental and enabling understanding of the disclosure. For the sake of clarity and simplicity, some objects depicted in the figures may not be drawn to scale.

In the Figures.

DETAILED DESCRIPTION

Overall Description of a Printing System

Figure 1:
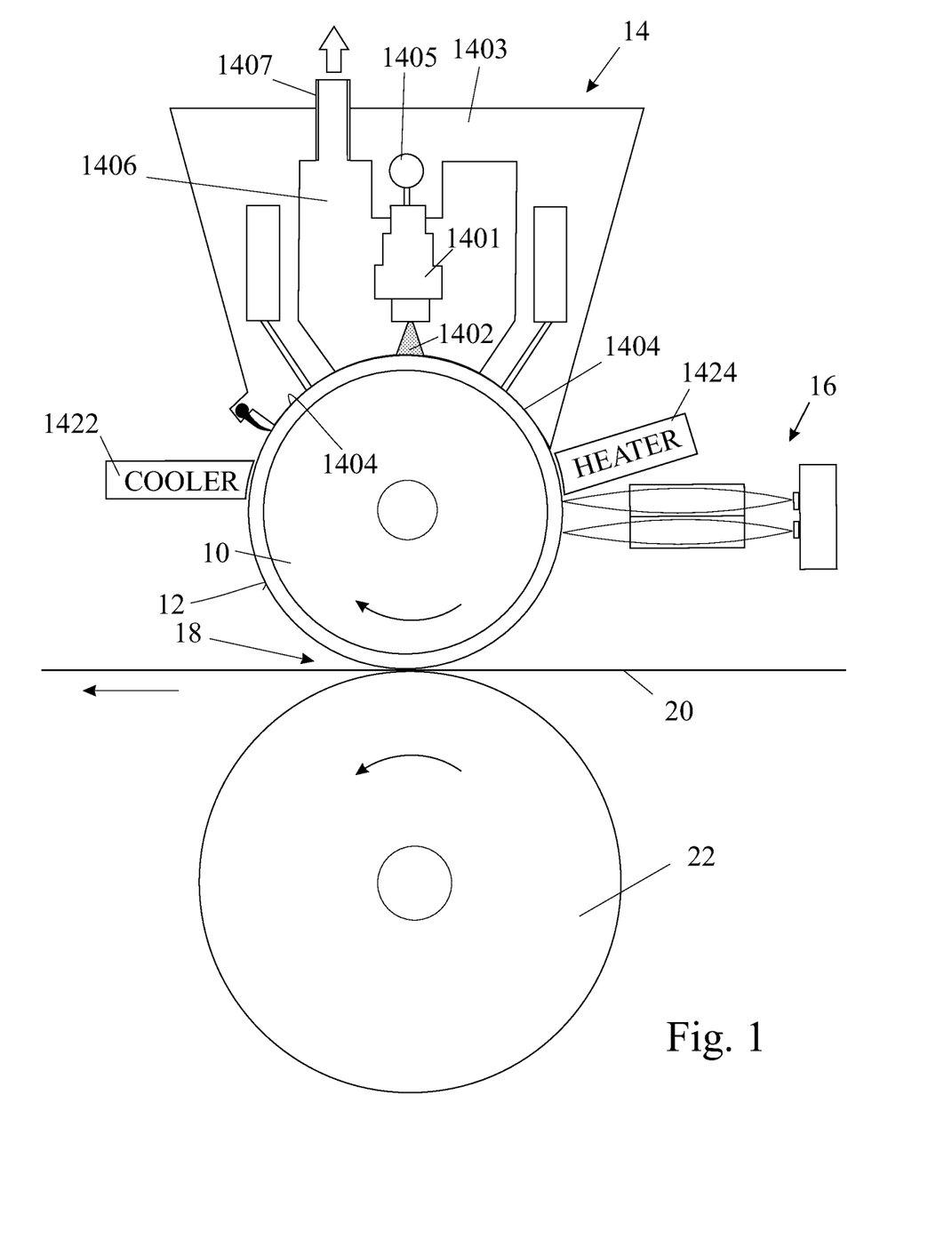
FIG. 1 depicts schematically a printing system as previously disclosed by the Applicant in WO2016/189512.

FIG. 1 shows a printing system as disclosed in WO2016/189512 of which the printing system of the present disclosure is a development. In FIG. 1, a drum 10 serving as a transfer member has an outer surface 12 that acts as an imaging surface. As the drum 10 rotates clockwise, as represented by an arrow, it cyclically passes beneath a coating station 14 where it acquires a monolayer coating of fine particles. After exiting the coating station 14, the imaging surface 12 passes beneath an imaging station 16 where radiation is applied by the imaging station 16 to selected regions of the imaging surface 12 to heat and render tacky the particle coating on the selected regions of the imaging surface 12. In FIG. 1, the radiation is applied by exposing the selected regions of the front side of the imaging surface 12 to laser radiation. By contrast, in the present disclosure, as described in more detail below, heat is directly applied to the rear side of the transfer member.

Next, the imaging surface 12 passes through a transfer station 18, having a nip where a substrate 20 is compressed between the drum 10 and an impression cylinder 22. While not shown in the figure, the impression cylinder may include on its outer surface a compressible layer. The pressure applied at the transfer station 18 causes the selected regions of the coating on the imaging surface 12 that have been rendered tacky by exposure to laser radiation in the imaging station 16, to transfer from the imaging surface 12 to the substrate 20. The regions on the imaging surface 12 corresponding to the selected tacky areas transferred to the substrate consequently become exposed, being depleted by the transfer of particles. The imaging surface 12 can then complete its cycle, by returning to the coating station 14 where a fresh monolayer particle coating is applied to the exposed regions from which the previously applied particles were transferred to the substrate 20 in the transfer station 18. This step can be viewed as a replenishment of the particle coating. As detailed below, the substrate, also termed printing substrate, may be made of various materials (e.g., paper, cardboard, plastics, fabrics etc.), some optionally existing in coated and uncoated form depending on desired characteristics, and can be supplied to the transfer station in different forms (e.g., as sheets or continuous webs).

The thermoplastic polymeric particles selectively heated for transfer to the substrate are said to form a film, or as further detailed hereinafter a polymer film. As used herein, the term "film" indicates that each spot of particle(s) exposed on the imaging surface may form a thin layer or coating of material, which may be flexible at least until transfer to the substrate at the transfer station. The term "film" should not be taken to mean that spots of adjacent particles that are heated at the imaging station are to transfer collectively as a continuous coating. It is believed that a thin film formed on the imaging surface (i.e. by one or more adjacent particles sufficiently exposed to a laser beam) may at most retain its thickness or become even thinner upon transfer. Hence the printing system and method according to the present teachings advantageously enable the printing on a substrate of a thin layer of particles that have been rendered tacky. In some embodiments, the printed film can have a thickness of 1 micrometer or less, or of no more than 800 nm, or of no more than 600 nm, or of no more than 400 nm, or of no more than 200 nm, or even of no more than 100 nm.

The Coating Station

The coating station 14 is essentially the same as described in WO2016/189512 and WO2016/189513 and will not therefore be described in detail herein. Essentially, the coating station comprises a plurality of spray heads 1401 that are aligned with each other along the axis of the drum 10. The sprays 1402 of the spray heads are confined within a bell housing 1403, of which the lower rim 1404 is shaped to conform closely to the imaging surface leaving only a narrow gap between the bell housing 1403 and the drum 10. The spray heads 1401 can be connected to a common supply rail 1405 which supplies to the spray heads 1401 a pressurized fluid carrier (gaseous or liquid) having suspended within it the fine particles to be used in coating the imaging surface 12.

The fluid and the surplus particles from the sprays heads 1401, which are confined within a plenum 1406 formed by the inner space of the housing 1403, are extracted through an outlet pipe 1407, which is connected to a suitable suction source represented by an arrow, and can be recycled back to the spray heads 1401. Though herein referred to as spray heads, any other type of nozzle or orifice along the common supply pipe or conduit allowing applying the fluid suspended particles are encompassed.

Figure 2:
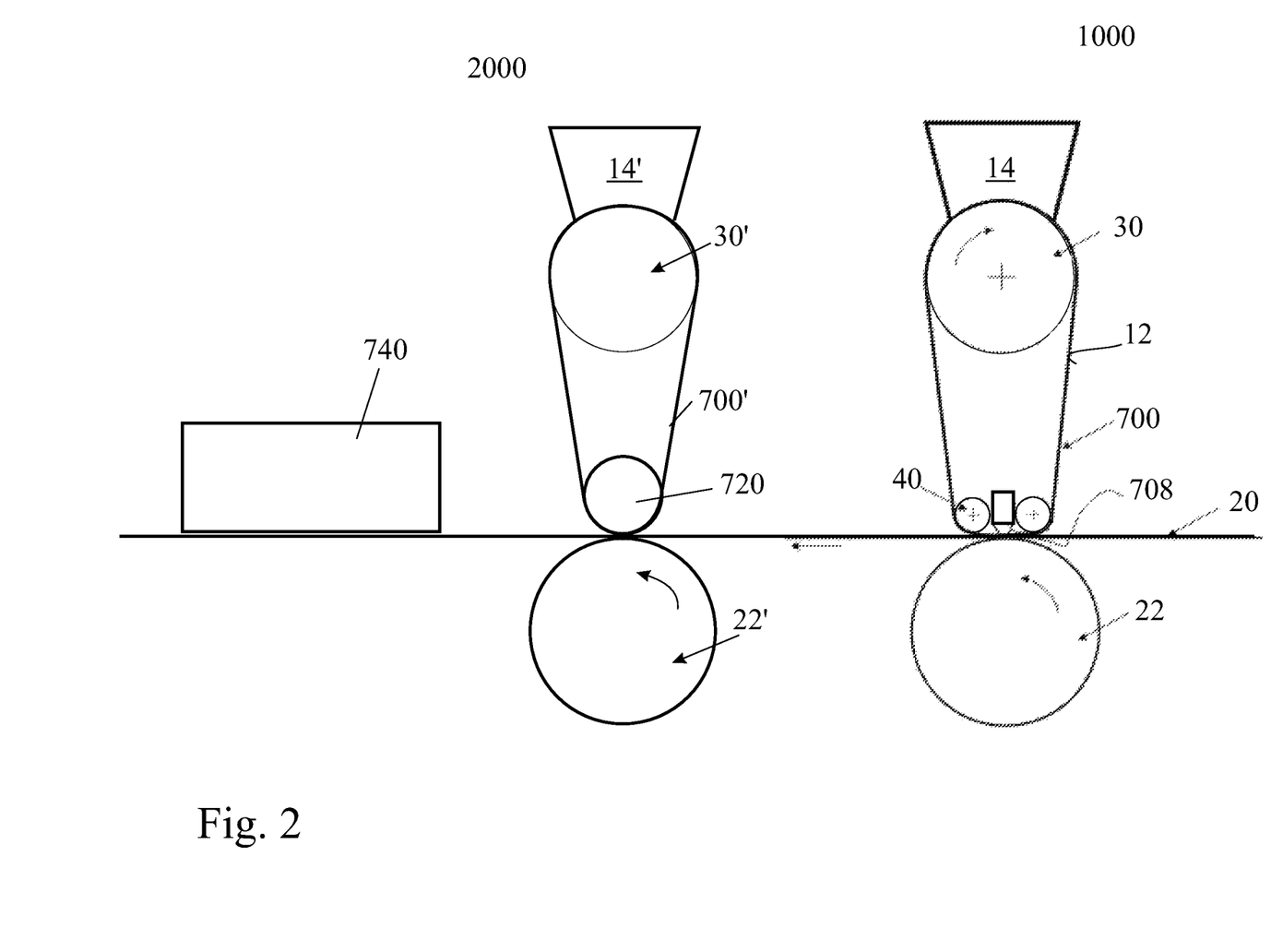
FIG. 2 is a schematic representation of a digital printing system of the present invention utilizing a thin thermally conductive transfer member.

As an alternative to the above-described direct spraying of the fluid and suspended particles onto the imaging surface, the coating station, may, as shown in FIG. 2 of WO2016/189512 comprise a rotatable applicator operative to wipe the fluid and suspended particles onto the surface. The rotatable applicator can alternatively be a brush having fiber or foam made bristles.

In some embodiments, there can be included on the entry side of the coating system 14, and typically at an external upstream location as shown in FIG. 1, a cooler 1422 allowing lowering the temperature of the imaging surface 12 before the previously exposed regions of the particle layer are replenished.

It is possible to provide both a cooler 1422 on the entry side of the coating system 14 and a heater 1424 on the exit side. Additionally, the drum 10 may be temperature controlled by suitable coolers/heaters internal to the drum, such temperature controlling arrangements being operated, if present, in a manner allowing the outer surface of the imaging surface, or portions thereof, to be maintained at any desired temperature.

The Coating Particles

The shape and composition of the coating particles are fully described in WO2016/189512. The invention described herein may employ particles that are pigmented, dyed or colorless. Briefly, for printing of high quality, it is desirable for the particles to be as fine as possible to minimize the interstices between particles of the applied monolayer coating, and to be preferably smaller than the required image resolution. Being dependent upon the desired image resolution, for some applications a particle size of up to 10 micrometer (μm) is deemed appropriate, in particular for pigmented thermoplastic particles. However, for improved image quality, it is preferred for the particle size to be a few micrometers and more preferably less than about 1 μm. In some embodiments, suitable particles can have an average diameter between 100 nm and 4 μm, 300 nm and 1 μm, in particular between 500 nm and 1.5 μm. On account of the manner in which such particles are produced, they are likely to be substantially spherical but that is not essential and they may be shaped as platelets.

In the case of colorless particles, such as those use to form a protective or decorative coating, such as a varnish or lacquer, it may be desirable to use particles as large as 5 micrometers, 10 µm, 20 µm, 30 µm or even 40 µm in average diameter. While colorless particles may be the sole type desired for a particular printing system or printing job, in some embodiments, to be further detailed in the following, the colorless particles are used as last to be applied on printing substrates to which colored particles were already transferred.

Typically such sizes are provided as average of the population of particles and can be determined by any technique known in the art, such as microscopy and Dynamic Light Scattering (DLS). The average diameter of a population of particles can be assessed by $D_v50$ (maximum particle hydrodynamic diameter below which 50% of the sample volume exists) and the size of a predominant portion of the population by $D_v90$, as measured by DLS.

In some embodiments, the polymer film resulting from the conversion of the monolayer of particles by exposure to heat applied by thermal conduction has a thickness of 2 µm or less, or of less than 1 µm, or even of less than 750 nm. In other embodiments, the thickness of the polymer film is of 100 nm or more, or of more than 200 nm, or even of more than 300 nm. The thickness of the polymer film may be in the range of 300 nm-1,000 nm, or of 500 nm-1,500 nm, or of 600 nm-800 nm, or of 700 nm-1,000 nm.

In embodiments, wherein the thermoplastic particles are colorless, being intended for instance for over-coating, the particles are typically larger than pigmented particles, and the film obtained following transfer may have accordingly a greater thickness. In such embodiments, the thickness of the polymer film can be of up to 40 µm, or of no more than 30 µm, or of no more than 20 µm, or of no more than 10 µm.

In some embodiments, the particles may be substantially hydrophobic.

The Particle Carrier

The particle carrier, that is to say the fluid within which the coating particles are suspended, may be either a liquid or a gas. If liquid, the carrier is preferably water based and if gaseous the carrier is preferably air. In the interest of economy, surplus particles extracted (e.g., sucked) from the interior of the plenum of a housing may be recycled to the supply and/or applicator device.

The Imaging Station

The imaging device 16 in FIG. 1 is also fully described in WO2016/189512 and need not be described herein in detail because in the present disclosure the imaging station is replaced by a thermal print head 708 in thermal contact with the rear side of a transfer member, as will be described in more details below by reference to FIG. 2.

The Imaging Surface

The imaging surface 12 in some embodiments is a hydrophobic surface, made typically of an elastomer that can be tailored to have properties as herein disclosed, generally prepared from a release-prone (e.g., silicone-based) material. The silicone-based matrix may have any thickness and/or hardness suitable to bond the intended particles. The suitable hardness is to provide a strong bond to the particles when they are applied to the imaging surface 12 in the coating station 14, the bond being stronger than the tendency of the particles to adhere to one another. It is believed that for relatively thin imaging surfaces (e.g., 5 µm or less), the release-prone material may have a medium to low hardness; whereas for relatively thick imaging surfaces (e.g., up to about 100 µm), the release-prone (e.g., silicone-based) material may have a relatively high hardness. In some embodiments, a relatively high hardness between about 60 Shore A and about 80 Shore A is suitable for the imaging surface. In other embodiments, a medium-low hardness of less than 60, 50, 40, 30, 20 or even 10 Shore A is satisfactory. In a particular embodiment, the imaging surface has a hardness of about 30-40 Shore A, a lower hardness believed to be preferable for spherical particles. The hardness is of at least 5 Shore A.

The hydrophobicity of the imaging surface enables the tacky film created by exposing the particles to heat applied by thermal conduction to transfer cleanly to the substrate without splitting. A surface is said to be hydrophobic when the angle formed by the meniscus at the liquid/air/solid interface, also termed wetting angle or contact angle, exceeds 90°, the reference liquid being typically distilled water. Under such conditions, which are conventionally measured using a goniometer or a drop shape analyzer and can be assessed at a given temperature and pressure of relevance to the operational conditions of the coating process, the water tends to bead and does not wet, hence does not adhere, to the surface.

The imaging surface 12 in FIG. 1 is the outer surface of a drum 10. In the present disclosure, however, as shown in FIG. 2, the imaging surface is the surface of an endless transfer member 700 having the form of a belt guided over guide rollers 40 and maintained under an appropriate tension by a drum 30 while it passes through the coating station 14. Additional architectures may allow the imaging surface 12 and the coating station 14 to be in relative movement one with the other. For instance, the imaging surface may form a movable platen which can repeatedly pass beneath a static coating station, or form a static platen, the coating station repeatedly moving from one edge of the platen to the other so as to entirely cover the imaging surface with particles. Conceivably, both the imaging surface and the coating station may be moving with respect to one another and with respect to a static point in space so as to reduce the time it may take to achieve entire coating of the imaging surface with the particles dispensed by the coating station. All such forms of imaging surfaces can be said to be movable (e.g., rotatably, cyclically, endlessly, repeatedly movable or the like) with respect to the coating station where any such imaging surface can be coated with particles (or replenished with particles in exposed regions).

While in FIG. 2, two guide rollers 40 bound the run of transfer member 700 subjected to the imaging device 16 and contacting its compressible element 708, this should not be construed as limiting, as one or more guide rollers or smooth sliders may be used for this effect.

The Transfer Member

Thermal transfer printing devices employing direct contact thermal print heads, such as the thermal print 708 shown in FIG. 2, are commercially available and in common use, primarily for printing tags and labels, bar codes and boarding passes. They conventionally use a ribbon coated with a thermoplastic colorant layer. The ribbon is sandwiched between a receiving substrate and the thermal print head, which selectively heats and melts the thermoplastic colorant, transferring it to the substrate in the form of a printed image. Since the thermoplastic colorant layer is a uniform film, once part of that film is transferred to a substrate, the resultant voids render the ribbon unsuitable for reuse. Thus, such thermal transfer printing processes are very wasteful and cost-ineffective.

In accordance with the embodiment of the invention shown in FIG. 2, the ribbon is replaced by the transfer member 700 which is re-usable for multiple printing cycles. When using a thermal print head 708 to apply energy to the imaging surface by direct thermal contact with the rear side of the transfer member, it is necessary to employ a transfer member which is as thin as 50 µm, 40 µm, 30 µm, 20 µm and even 10 µm. In its most basic form, such a transfer member may comprise only two layers, namely a heat-resistant polymer base layer and the above described imaging surface.

Examples of heat resistant polymers suitable for thin base layers are well known in the art, including polyimide (such as Dupont Kapton®), polyether ether ketone (PEEK), aramid polymers, styrene-acrylonitrile copolymers and the like. In the case of low melt temperature particles, lower temperature polymers such as PET, which is the most commonly used polymer for base layers in conventional thermal transfer ribbons, may be employed as a base layer.

The imaging surface should readily release the tacky film of particles during the transfer step. For assisting in the transfer of the tacky film of particles from the imaging surface to the substrate, the imaging surface may be hydrophobic, with a low surface energy. Many such low surface energy surfaces are well known in the art and include common silicone release coatings, silicone elastomers, fluorosilicone compounds, fluoropolymers, fluroelastomers and the like. Any of the aforementioned release materials can be employed as the release layer of the imaging surface of such thin transfer members.

As is well known in the art of thermal transfer ribbons, it is desirable to coat the base layer with an additional "backcoat" (sometimes known as a backing layer or slip layer), in order to reduce the sliding friction between the transfer member and the thermal print head and to reduce wear of the print head. Exemplary backcoat materials well known in the art include silicone oils, UV cured silicones and silicone block copolymers. Such backcoat compositions may also include "slip agents" well known to those skilled in the art, including derivatives of long chain carboxylic or phosphoric acids, long alkyl chain esters of phosphoric acid, and long alkyl chain acrylates.

In FIG. 2, a first printing system, designated 1000, is based on that shown in FIG. 1 save that the imaging system 16 is replaced by a thermal transfer head 708 and the transfer member is a belt rather that a drum. In this embodiment, after passing through the nip of this first printing system 1000, where typically the coating station 14 applies a monolayer of pigmented thermoplastic particles, the substrate passes through the nip of a second printing system 2000 where the thermoplastic particles, when transferred to the substrate, can serve as a varnish or protective or decorative coat. In this printing system 2000, a coating station 14' applies a monolayer of transparent particles to a transfer member 700' passing over a drum 30'. There is however no selective heating of the particles in the transfer member 700' by a thermal print head. Instead, in the transfer member 700' is pressed against the substrate 20 and transparent particles are transferred to the substrate either because the polymer film on the substrate applied by the printing system 1000 is still tacky or because a pressure roller 720 and/or the impression cylinder 22' is heated. In the former case, only image areas of the substrate will have a varnish coating, whereas in the latter case the entire surface of the substrate will receive a transparent coating. FIG. 2 also shows a finishing station 740 where the polymer film may undergo thermal treatment to fix, cure or dry the polymer film. If such thermal treatment is accompanied by pressure contact with the polymer film, it may also serve to impart a desired surface finish, such as a gloss, to the surface of the substrate.

Figure 3:
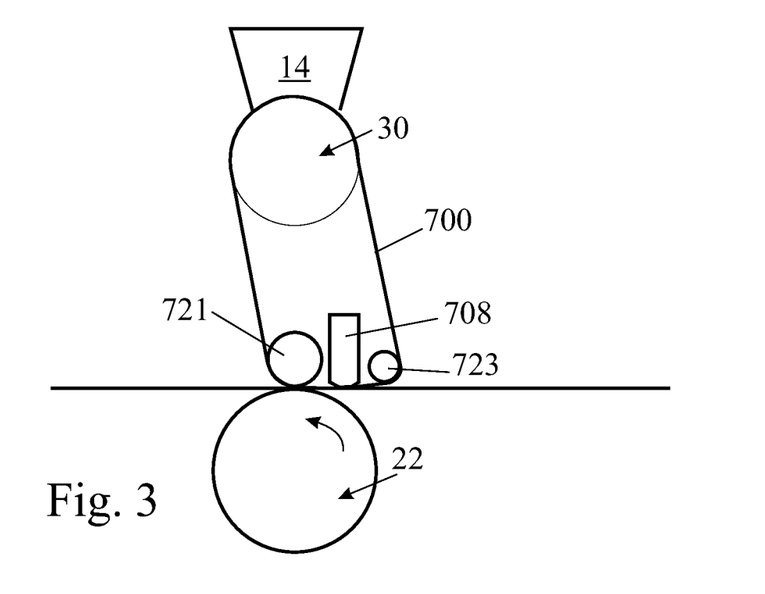
FIGS. 3 and 4 are schematic representations of alternative embodiments of a digital printing system as exemplified in FIG. 2.

In FIG. 2, the thermal transfer head 708 is shown as being located at the nip at which the particles that are rendered tacky are transferred onto the substrate 20. This however is not essential and, as shown in FIG. 3, the nip may be defined between the impression cylinder 22 and a pressure roller 721 and the thermal transfer head 708 in the path of the transfer member between the pressure roller 721 and a guide roller 723. In such a case, where the particles are first rendered tacky and are only subsequently pressed into contact with the receiving substrate, the particles must retain at least some degree of tackiness from the time they are heated until the time they contact the substrate. This can be achieved by either ensuring that the thermal characteristics of the transfer member and/or the particles are adequate to keep the particles warm enough (i.e. tacky) until said contact is made, or, preferably, by employing thermoplastic particles which have a delayed crystallization characteristic (termed "open time" in the art of hot melt adhesives) adequate to retain tackiness until pressed into contact with the substrate.

While the transfer member 700 may have a low friction backcoat, as described above, in the embodiment of FIG. 4, a lubricant can be applied in the gap formed between the rear side of the transfer member 700 and the thermal print head 708. The embodiment of FIG. 4 only differs from that of FIG. 3 by the addition of a lubricant applicator in the form of a roller 725.

Figure 4:
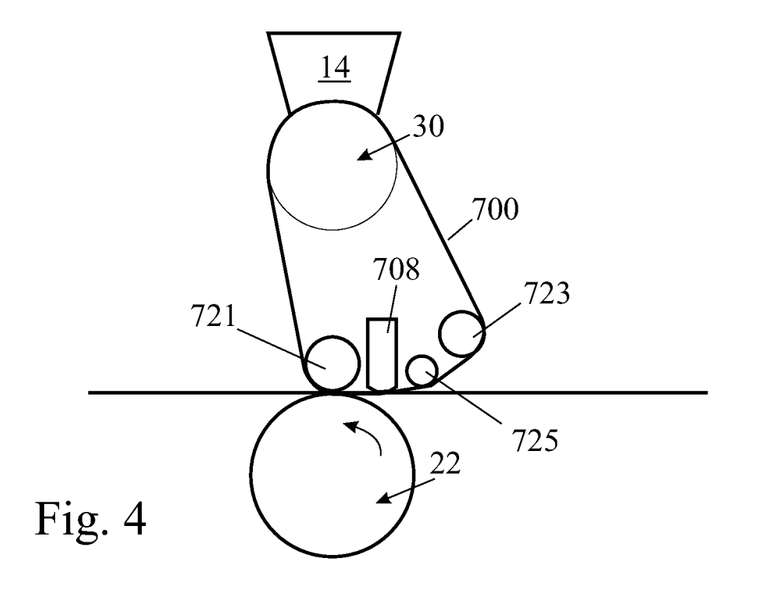

In FIG. 4, lubrication is applied to the rear surface of the transfer member 700 by a lubrication roller 725 positioned upstream, and preferably close to the thermal print head 708. Lubrication roller 725 extends parallel to the rotational axes of the pressure roller 721 and the guide roller 723 and across the entire width of transfer member 700. Lubrication roller 725 may comprise a hollow tube in fluid communication with a lubricant reservoir (not shown here), and having a multitude of apertures along its cylindrical surface. The hollow tube may be further enveloped along its cylindrical surface with a compressible sleeve made of a porous material, such a sponge. The sleeve is thereby configured to allow liquid to drip in a generally radial direction from the hollow tube through the apertures and the sleeve onto the rear side of the transfer member 700.

Lubrication roller 725 is positioned so that its compressible sleeve contacts the transfer member, and is configured to revolve about its axis. It may revolve correspondingly to the movement of the transfer member (e.g., by being driven by friction with the transfer member) or it may revolve independently of the movement of the transfer member so that the surface of sleeve slides over the rear surface of the transfer member. In some embodiments, the lubrication roller 725 may revolve in the opposite direction to the direction determined by the movement of the transfer member.

In operation, the hollow tube may be substantially filled with lubricant and lubricant may correspondingly drip through the apertures of the hollow tube and through the compressible sleeve to be smeared on the rear surface of the transfer member. According to some embodiments lubricant may be pressurized through the apertures, e.g., by a pump, and according to some embodiments oil drips through the apertures through gravitational force.

In any configuration of the printing system, the lubricant is compatible with the transfer member and any element (e.g., guiding rollers) the lubricant may contact in the transfer member path, and advantageously stable at least at temperatures generated by the thermal print head in operation of the printing system. The lubricant typically has a surface tension higher than the surface energy of the transfer member, beading on the face the oil is due to lubricate.

In some embodiments the lubricant may be a silicone oil that is adapted to penetrate through the transfer member so as to exude on the imaging surface to form a thin film thereon and enhance release of tacky particles or film onto the substrate at the transfer station as described above. In such embodiments the use of a suitable silicone oil as a lubricant on the rear side of the transfer member may prolong the useful life expectancy of the transfer member, because, in contrast to spontaneous release of silicone oils from a silicone matrix, which may diminish and even end over time, the added lubricant is supplied incessantly during operation. The viscosity of the silicone oil may be selected in accordance with the permeability of the silicone matrix of the transfer member and with the total thickness thereof, to obtain sufficient penetration of the silicone oil through the transfer member, yet to avoid swelling of the transfer member to an extent that may affect the imaging surface uniformity, hence print quality. Similarly, the molecular weight of the silicone oil may be small enough to allow diffusion through the transfer member, yet sufficiently high to control the rate of diffusion. In any event, the amount of silicone oil that may be desorbed from front side of the transfer member is sufficiently high to provide the desired release of the image formed on the imaging surface, yet sufficiently low, so as to avoid any significant transfer to the printing substrate. A lubricant, which in a particular embodiment, facilitates the release of the ink image from the transfer member to the printing substrate is considered "a release enhancing aid". In some embodiments the viscosity lies within the range of 30-400 mPa·S. More preferably, the viscosity may lie within the range of 50-300 mPa·S.

The digital printing system shown in FIG. 2 can only print in one color but multicolor printing can be achieved by passing the same substrate successively through multiple arrangements of coating, imaging and transfer stations (such as illustrated by printing system 1000) that are synchronized and/or in registration with one another and each printing a different color. In such case it may be desirable to provide substrate treating stations between the different coating stations. A treating station can be, for instance, a cooler able to reduce the temperature of the substrate on its exit of a previous transfer station. As some transferred films may retain some residual tackiness to a degree that may impair a subsequent transfer of different particles, it may be advantageous to eliminate such residual tackiness by cooling of the film transferred to the substrate. Depending on the thermoplastic polymer, the elimination of any residual tackiness, or its reduction to a level not affecting the process, can alternatively be achieved by a treating station being a curing station.

Moreover, while in previous paragraph each arrangement of coating, imaging and transfer stations was considered for the sake of printing a different color, in a further embodiment, one set of such stations (in a printing system comprising at least two said arrangements of stations as illustrated by printing system 1000) can be used to apply colorless particles. For instance, the colorless particles can be applied at the final arrangement. In such a case, the colorless film of tacky thermoplastic particles of the last coating station, exposed to radiation of the last imaging station, are transferred at the last transfer station, for instance, to serve as overcoat to the previous colored films. These stations can be said to form an over-coating arrangement or sub-system. Conversely, an arrangement for colorless printing can be the first of a series, for instance, to modify the later application of colored films and/or the visual effect they may provide. These stations can be said to form an under-coating arrangement or sub-system.

Furthermore, a printing system, even if monochrome, may include a perfecting system allowing double-sided printing. In some cases, perfecting can be addressed at the level of the substrate transport system, which may for example revert a substrate to a side not yet printed on and return the unprinted side of the substrate to the same treating and impressions stations having served to print the first side. In other cases, perfecting can be addressed by including two separate transfer stations (and their respective upstream or downstream stations), each transfer station enabling printing on a different side of the same substrate.

The Substrate

The printing systems shown in the drawings are not restricted to any particular type of substrate. The substrate may be individual sheets of paper or card or it may have the form of a continuous web. Because of the manner in which a thin film of softened polymeric particles is applied to the substrate, the film tends to reside on the surface of the substrate. This allows printing of high quality to be achieved on paper of indifferent quality. Furthermore, the material of the substrate need not be fibrous and may instead be any type of surface, for example a plastics film or a rigid board.

In some embodiments, the surface of the printing substrate can be treated to favor the transfer of the films of tacky particles. Treatment can be physical (e.g., by corona) or chemical (e.g., the substrate including a suitable external coat).

The Transfer Station

The transfer station illustrated in FIG. 2 comprises only a smooth impression cylinder 22 that is pressed against the transfer member 700 and its outer imaging surface 12. The impression cylinder 22 may form part of a substrate transport system, in which case it may be equipped with grippers for engaging the leading edge of individual substrate sheets. In other than digital printing systems, the impression cylinder 22 may have an embossed surface to select the regions of the particle coating to be transferred to the substrate 20.

In the description and claims of the present disclosure, each of the verbs, "comprise" "include" and "have", and conjugates thereof, are used to indicate that the object or objects of the verb are not necessarily a complete listing of features, members, components, elements, steps or parts of the subject or subjects of the verb.

As used herein, the singular form "a", "an" and "the" include plural references and mean "at least one" or "one or more" unless the context clearly dictates otherwise.

Positional or motional terms such as "upper", "lower", "right", "left", "bottom", "below", "lowered", "low", "top", "above", "elevated", "high", "vertical", "horizontal", "front", "back", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

Unless otherwise stated, the use of the expression "and/or" between the last two members of a list of options for selection indicates that a selection of one or more of the listed options is appropriate and may be made.

In the disclosure, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended, or within variations expected from the measurement being performed and/or from the measuring instrument being used. When the term "about" precedes a numerical value, it is intended to indicate +/−15%, or +/−10%, or even only +/−5%, and in some instances the precise value.

While this disclosure has been described in terms of certain embodiments and generally associated methods, alterations and permutations of the embodiments and methods will be apparent to those skilled in the art. The present disclosure is to be understood as not limited by the specific embodiments described herein.

To the extent necessary to understand or complete the disclosure of the present invention, all publications, patents, and patent applications mentioned herein, including in particular the applications of the Applicant, are expressly incorporated by reference in their entirety by reference as is fully set forth herein.

The invention claimed is:

1. A printing system for thermal transfer printing onto a surface of a substrate, the system comprising:
   a) a transfer member having opposite front and rear sides with an imaging surface on the front side,
   b) a coating station at which a monolayer of particles made of, or coated with, a thermoplastic polymer is applied to the imaging surface,
   c) an imaging station at which energy is applied via the rear side of the transfer member to selected regions of the imaging surface to render particles coating the selected regions tacky, and
   d) a transfer station at which said imaging surface of said transfer member and the surface of the substrate are pressed against each other to cause transfer to the surface of the substrate of the particles that have been rendered tacky;
   the imaging station comprising a thermal print head in thermal contact with the rear side of the transfer member and operative to apply energy to the selected regions by heat conduction through the transfer member.

2. The printing system of claim 1, wherein said transfer station comprises an impression cylinder positioned facing the front side of the transfer member so as to define a nip at which said imaging surface of said transfer member and the surface of the substrate are pressed against each other, and wherein the thermal print head of the imaging station is aligned to apply heat to the rear side of the transfer member at and/or adjacent the nip, so that rendering of the particles coating the selected regions tacky, and pressing of said imaging surface of said transfer member and the surface of the substrate against each other, occur substantially concurrently.

3. The printing system of claim 1, further comprising a lubrication system configured to controllably release a lubricant to the rear side of the transfer member to lubricate the rear side as the rear side slides over the thermal print head.

4. The printing system of claim 3, wherein the transfer member has a thickness, and the lubricant is capable of passing through the thickness of the transfer member to act as a release enhancing aid.

5. The printing system of claim 1, further comprising a processing station for processing the substrate after passage through the transfer station.

6. The printing system of claim 5, wherein the processing station includes a heater operative to heat particles that were transferred onto the surface of the substrate and/or to heat the substrate.

7. The printing system of claim 6, wherein the heater does not contact the particles that are to be heated.

8. The printing system of claim 6, in which the heater includes a heated silicone-coated roll or belt for contacting the particles that are to be heated.

9. The printing system of claim 1, wherein an open time of the particles transferred to the surface of the substrate at the transfer station is such that the transferred particles remain tacky at least until contacted at a second transfer station by a layer of particles which adhere to said transferred particles that have remained tacky.

10. A method of thermal transfer printing onto a surface of a substrate, which comprises:
    a) providing a movable transfer member having opposite front and rear sides with an imaging surface on the front side,
    b) applying to the imaging surface a monolayer coating of particles made of, or coated with, a thermoplastic polymer,
    c) applying heat by thermal conduction via the rear side of the transfer member to selected regions of the imaging surface to render the particles coating the selected regions tacky, and
    d) pressing the imaging surface and the surface of the substrate against one another to cause transfer to the surface of the substrate of the particles that have been rendered tacky.

11. The method of claim 10, further comprising repeating step b) to apply a fresh monolayer coating of particles to the selected regions from which the particles which were rendered tacky were transferred to the substrate surface in step d), to leave the imaging surface uniformly coated with a monolayer of particles, which can be repeatedly subjected to steps c) to e).

12. The method of claim 10, wherein the pressing against one another and the rendering of the particles coating the selected regions tacky occur substantially concurrently.

13. The method of claim 10, wherein said applying heat by thermal conduction is conducted at least in part by a thermal print head in thermal contact with the rear side of the transfer member applying energy by thermal conduction through the transfer member, the method further comprising controllably releasing a lubricant to the rear side of the transfer member to lubricate the rear side as the rear side slides over the thermal print head.

14. The method of claim 13, wherein the lubricant is capable of passing through a thickness of the transfer member to act as a release enhancing aid.

15. The method of claim 10, further comprising processing the substrate subsequent to the pressing.

16. The method of claim 15, wherein the processing includes heating particles that were transferred onto the surface of the substrate and/or heating the substrate.

17. The method of claim 16, wherein the heating is performed by a heater which does not contact the particles that are to be heated.

18. The method of claim 16, wherein the heating is performed by a heater which includes a heated silicone-coated roll or belt for contacting the particles that are to be heated.

19. The method of claim 10, wherein an open time of the particles transferred to the surface of the substrate is such that the transferred particles remain tacky at least until subsequently contacted by a layer of particles which adhere to the transferred particles that have remained tacky.

\* \* \* \* \*

UNITED STATES PATENT AND TRADEMARK OFFICE
CERTIFICATE OF CORRECTION

PATENT NO. : 10,815,360 B2
APPLICATION NO. : 16/465041
DATED : October 27, 2020
INVENTOR(S) : Benzion Landa It is certified that error appears in the above-identified patent and that said Letters Patent is hereby corrected as shown below:

In the Specification

Column 8, Lines 42-43, replace 'imaging device 16 and contacting its compressible element' with --thermal print head--

In the Claims

Column 14, Line 31 (in the last line of Claim 11), replace 'e)' with --d)--

Signed and Sealed this
Sixth Day of September, 2022

Katherine Kelly Vidal
*Director of the United States Patent and Trademark Office*